2,912,319
METHOD FOR DESULPHURIZING IRON

Olav Moklebust, Homewood, Ala., assignor to National Lead Company, New York, N.Y., a corporation of New Jersey No Drawing. Application November 20, 1958
Serial No. 775,108

Claims priority, application Norway November 23, 1957

7 Claims. (Cl. 75—33)

This invention relates to a method of desulphurizing iron. More specifically it relates to a process for removing sulphur from reduced iron ores prepared by relatively low temperature reduction operations.

The low temperature reduction of ferruginous ores or ore agglomerates, such as pellets or briquettes, is usually carried out in the temperature range of 900–1200° C. The ore or ore agglomerates are heated gradually to the reduction temperature and the reduction is carried out by means of gas and/or solid carbonaceous reducing agents, such as, for instance, coke breeze. The iron values of the ore are reduced to metallic iron without melting of the ore particles and/or agglomerates. The reduction is usually carried out in shaft furnaces or in rotary furnaces.

When the reduction is carried out in a rotary furnace, the ore is mixed with a large excess of carbonaceous material, for instance coke breeze. The mixture is fed into the upper end of the furnace and is heated gradually to the reduction temperature in counter-current to the furnace gases. The mixture is held at this temperature, i.e. in the reducing zone of the furnace, until the desired degree of reduction is obtained whereafter the mixture of reduced ore, excess of coke and ashes is discharged from the furnace and cooled in a neutral or reducing atmosphere.

If the ore, which is to be reduced, contains some sulphur most of this will accompany the reduced ore and a metallic iron having a high content of sulphur is obtained. In addition thereto the metallic iron takes up a very large portion of the sulphur contained in the reducing agents, such as gas, oil or coke breeze.

In order to avoid this and to obtain a metallic iron having a low content of sulphur, lime, limestone or dolomite is usually added to the mixture of ore and coke. The lime is usually added as limestone and in an amount of from 5–10% calculated on the weight of the ore. The limestone is calcined in the furnace and forms quicklime which combines with a substantial amount of the sulphur from the reducing agent and from the ore and gives a metallic iron having a low sulphur content. The larger the amount of limestone, which is added, and the more finely grained this is, the better the desulphurization will be, due to the increased reaction surface of the lime. If, however, very finely divided limestone is used, these fine grains will after having been calcined and having reacted with the sulphur, cause serious operational difficulties as sintered deposits form in the furnace. In order to avoid this the limestone must be added in a fairly coarse form, approximately plus 3 mm. and in order to obtain the desired reaction surface larger amounts of limestone must consequently be added, but even when employing coarse grained limestone, the danger of sintering deposits and breaks in the operation are not eliminated. The coarse grained limestone will upon calcination at approximately 900° C. in the preheating zone become brittle and will to a substantial degree be ground to very fine grains in the further passage through the furnace. Calcium sulphide which is formed will together with the finely grained lime, fine grains of ore, coke ash, etc. sinter and build up coatings in the reduction zone so that the furnace in some cases even must be stopped, cooled and cleaned. In the reduction of ores which require relatively high reduction temperatures, for instance 1150–1200° C., it has even happened that the coarse grains of lime having a particle size of 3 mm. have sintered completely so that no lime at all was discharged from the furnace.

Hitherto these difficulties have to some degree been avoided by maintaining the maximum temperature in the furnace, i.e. the temperature of reduction, so low that a deposit in the furnace is avoided as far as possible. Usually the highest possible degree of reduction of the iron is aimed at and the ore is treated at the highest possible reduction temperature which can be employed without the charge sintering together or detrimental deposits forming in the furnace. In other words the reduction is carried out on the border of sintering. Common iron ores, such for example as hematite and magnetite ores or ore concentrates, may usually be treated at a reduction temperature of 1050–1150° C. without disturbing sintering when the ore particles and coke particles are not too fine. Difficultly reducible ores, however, such for example as ilmenite ore ($FeO \cdot TiO_2$), may be treated at higher temperatures, for instance 1150–1200° C., without sintering. It is then possible to obtain approximately 90–98% reduction of the iron.

If, however, limestone is added to the mixture the tendency to sinter is considerably increased so that it becomes necessary to lower the reduction temperature to approximately 1100° C. with the result that the degree of reduction falls to approximately 70–80%.

As an illustration it may be mentioned that in the reduction of 5 mm. pellets of ilmenite concentrate at a reduction temperature of 1180° C. 95% reduction of the iron was obtained when no limestone addition was used. When limestone of approximately 3 mm. particle size was employed, the coke built up on the walls of the furnace to such a degree that the furnace had to be shut down. By maintaining a reduction temperature at approximately 1100° C. a disturbing sintering was avoided, but the degree of reduction obtained was only 70%. Even at this reduction temperature it has been found that a gradual, although slow, building up of a coating in the furnace will take place as a certain amount of fine lime and calcium sulphide particles always will be formed by abrasion in the furnace and these particles will, after a certain period of time, form a coating in the furnace.

An object of this invention is to provide a method for desulphurizing iron. Another object is to provide an improvement for removing the sulphur values from reduced iron ores, said reduced iron ores having been produced by relatively low temperature reduction in the presence of carbonaceous reducing material. These and other objects will become apparent from the following more complete description and from the examples.

In general the reducing operation as contemplated herein corresponds to that described in United States Patent No. 2,829,042.

According to the present process the reduction is carried out without the addition of a desulphurizing agent to the reduction mixture which is fed into the furnace. The reduction is carried out at the optimum temperature for the ore and coke mixture in question. The desulphurization is carried out after the reduction has been completed by adding the desulphurizing agent to the mixture of reduced ore and coke during the cooling of the mixture. Tests have shown that by adding limestone to the reduced mixture at approximately 1100–1000° C. during the cooling of the material a desulphurization equal to that obtained when limestone accompanies the material through the furnace, is achieved. By using lime instead of limestone it is possible to obtain a good desulphurization even at lower temperatures.

It has been found that when limestone or dolomitic limestone in finely divided form is added to the reduced ore at a temperature not exceeding 1100° C. and the mixture during the cooling is held at temperatures between 1100° and 800° C. for at least ½ hour a satisfactory desulphurization of the reduced iron is obtained.

The present process may be employed for desulphurization of reduced products of ores, ore concentrates, agglomerates (pellets, briquettes), metal powders, and the like, when the sintering tendency of the product to be treated is taken into consideration.

The efficiency of the desulphurization depends upon and will vary with the size and the porosity of the ore aggregates, the sulphur content of the ore, coke and oil, as well as the temperature and the amount and surface area of the desulphurizing agent. The maximum permissible temperature which may be employed in the furnace without disturbing sintering taking place is dependent upon the type of ore and the particle size and composition of the ore.

By the present method the following advantages are obtained:

The ore or ore agglomerates may be reduced at the optimum reduction temperature without disturbing sintering on account of the desulphurizing agent. The maximum reduction of the ore is obtained. Heat for raising the temperature of and calcining the desulphurizing agent (limestone) is saved as the heat given up by the reduced material during the cooling is utilized. The capacity of the furnace is raised as the feed may be increased by an amount corresponding to the amount of limestone added, usually approximately 10%. By adding the desulphurizing agent, for instance limestone, to the mixture of the reduced ore and excess of coke at the discharge end of the furnace at a temperature below the reduction temperature, reducing gas is evolved which will improve the degree of reduction. The limestone, $CaCO_3$, will liberate carbon dioxide which together with the excess coke will form carbon monoxide which in turn will have a reducing effect on the ore. Due to the limestone being added at a reduced temperature so that there is no danger of sintering even finely grained limestone may be employed. The desulphurization will, therefore, be more efficient on account of the increased reaction surface.

In the usual method of desulphurization, by adding limestone to the furnace charge, it is necessary to employ coarse grained limestone which is produced by crushing and sieving. The finer grains cannot be used and are wasted. The consumption of limestone is therefore much higher than in the present method.

By first agglomerating the ore or ore concentrates to larger aggregates in the form of pellets or briquettes it will be possible to run the furnace without sintering at a higher temperature than when finely divided ore or ore concentrate is employed. A higher degree of reduction is, therefore, obtained. On the other hand it is not possible to add the desulphurizing agent to the mixture of pellets and coke which is fed into the furnace, as the desulphurizing agent, for instance limestone, will cause disturbing sintering in the reduction zone of the furnace at the higher temperatures employed. In such cases it is of great importance that the desulphurization may be carried out after the reduction, at a lower temperature.

The following examples are given to illustrate the process:

*Example I*

Ten parts by weight of oxidic iron ore containing 35% Fe and 0.1% S and having a particle size of minus 20 mesh (Tyler Standard) were mixed with seven parts by weight of coke breeze of minus 3 mm. and one part by weight of limestone of approximately 3 mm. particle size. The mixture was fed to an oil-fired rotary furnace and gradually heated in counter-current to the furnace gases to the temperature of reduction. The maximum temperature which the mixture would stand without sintering, was 1050° C. The reduced ore which was discharged from the furnace, cooled and separated from the excess coke and lime by dry magnetic separation analyzed:

|  | Percent |
|---|---|
| Total Fe | 37 |
| Metallic Fe | 30 |
| S | 0.05 |

It will be noted that the desulphurization was good but only 81% of the iron was reduced to metal.

In the next trial the ore was introduced into the furnace under the same conditions with the exception that no lime was added. The furnace could then be run at a maximum reduction temperature of 1100° C. without disturbing sintering. The reduced ore was separated from excess coke and ash by dry magnetic separation and analyzed:

|  | Percent |
|---|---|
| Total Fe | 38 |
| Metallic Fe | 36.5 |
| S | 0.4 |

The sulphur content was very high, but 96% of the iron was reduced to metal.

During continued operation under the same conditions limestone in an amount of approximately 5% of the weight of the ore and having a particle size of approximately 1 mm. was added to the reduction mixture as this was discharged from the furnace at a temperature of approximately 1100° C. The mixture was cooled in a rotary cooler for approximately 45 minutes.

After cooling and separation of the excess coke and lime by dry magnetic separation the reduced ore analyzed:

|  | Percent |
|---|---|
| Total Fe | 38.5 |
| Metallic Fe | 37.0 |
| S | 0.08 |

The degree of reduction was high, 96%, and the desulphurization good. It is also surprising that the desulphurization takes place in the relatively short time which is necessary for cooling the material.

*Example II*

100 parts by weight of a titaniferous iron ore, ilmenite, having a particle size of approximately 20 mesh and containing 36% iron in the form of iron oxide as well as 44% titanium dioxide and 0.2% sulphur, and admixed with 70 parts by weight of coke could be reduced in the presence of 10 parts by weight of limestone in a rotary furnace at 1100° C. without sintering. The reduced ore analyzed:

|  | Percent |
|---|---|
| Total Fe | 38.0 |
| Metallic Fe | 25.0 |
| S | 0.05 |

The degree of reduction was consequently 66%.

A mixture of 100 parts by weight of the same ilmenite and 70 parts by weight of coke without any addition of lime was fed to the furnace and could be reduced at a maximum temperature of 1130° C. without sintering. The reduced product analyzed:

|  | Percent |
|---|---|
| Total Fe | 39 |
| Metallic Fe | 37 |
| S | 0.4 |

The degree of reduction was consequently in this case 95%.

To this reduced product which was discharged from the furnace at approximately 1100° C., were added 5 parts by weight of limestone, having a particle size of approximately 20 mesh. The cooled reduced ore analyzed:

| | Percent |
|---|---|
| Total Fe | 39 |
| Metallic Fe | 38 |
| S | 0.07 |

*Example III*

According to the process of Norwegian patent No. 90,497 reduced pellets of finely grained ilmenite concentrate (44% $TiO_2$, 36% Fe) are reduced in a rotary furnace at approximately 1180° C. The relatively high reduction temperature is necessary to obtain substantially complete reduction of the iron and simultaneously a sufficiently large size of the metallic iron particles so that these, after cooling of the reduced pellets, may be recovered by crushing and separation from the titanium oxide concentrate. The sulphur content of the recovered metallic iron is of great importance in connection with the quality of the iron product.

At the relatively high reduction temperature the desulphurizing agent, for instance limestone, cannot be added to the mixture of pellets and coke which is fed to the furnace, without the formation of so large deposits in the furnace that this must be shut down.

During a trial in which were added 10% of limestone having a particle size of 3 mm., all the lime deposited on the walls of the furnace so that the furnace had to be shut down after a few hours operation.

The reduction process is, therefore, carried out without the addition of lime to the charge. The reduced pellets usually analyzed:

| | Percent |
|---|---|
| $TiO_2$ | 50 |
| Total Fe | 39 |
| Metallic Fe | 38 |
| S | 0.4 |

These pellets will upon crushing and separation, give a metallic iron product containing 94% Fe and 0.08% S.

By employing the present method of desulphurizing, i.e. by adding the desulphurizing agent after the reduction, at a lower temperature, approximately 1100° C., during slow cooling the reduced and desulphurized pellets analyzed:

| | Percent |
|---|---|
| $TiO_2$ | 50 |
| Total Fe | 39 |
| Metallic Fe | 38 |
| S | 0.1 |

These pellets will upon crushing and separation yield a metallic iron product containing 94% Fe and 0.01–0.02% S. The low sulphur content is of great importance when the product is employed in the production of steel and for powder metallurgical purposes.

It is surprising that sulphur which already has been taken up by the metallic iron from the reducing agents during a relatively long reduction period (approximately 6–9 hours) and at a relatively high temperature (approximately 1180° C.) may be removed by means of lime at a lower temperature (below 1100° C.) in such a short time (approximately ½ hour).

It has been demonstrated that by employing the process of the instant invention one is enabled to achieve desulphurization of the iron values without sacrificing any of the usual advantages inherent in rotary kiln reduction operations. The sulphur originally contained in both the iron ore and in the reducing agents is effectively removed by the technique described and the sulphur-free iron values are useful for subsequent processing as is known in the trade.

I claim:

1. Improvement in method for desulphurizing iron produced by reduction of iron containing ores, concentrates, and agglomerates with solid carbonaceous reducing agents at elevated temperatures without melting of iron values comprising the steps of cooling reduced iron product from the reduction in a non-oxidizing atmosphere to approximately 1100° C., forming an admixture of the reduced iron product and a desulphurizing agent and subsequently gradually cooling the admixture under controlled conditions so that temperatures between about 1100° C. and about 800° C. are maintained for at least thirty minutes.

2. Method according to claim 1 wherein the desulphurizing agent is limestone.

3. Method according to claim 1 wherein the desulphurizing agent is dolomite.

4. Method according to claim 1 wherein the desulphurizing agent has a particle size of minus one mm.

5. Method according to claim 1 wherein the desulphurizing agent is employed in amount between 1 and 10 percent, calculated on the weight of iron containing ore.

6. Method according to claim 5 wherein the desulphurizing agent is employed in amount of approximately 5 percent.

7. Method according to claim 1 wherein the desulphurizing agent is lime.

References Cited in the file of this patent

UNITED STATES PATENTS

| 2,663,632 | Oppegaard | Dec. 22, 1953 |
| 2,684,296 | Moklebust | July 20, 1954 |
| 2,829,042 | Moklebust | Apr. 1, 1958 |